No. 793,881.

Patented July 4, 1905.

UNITED STATES PATENT OFFICE.

ISIDOR KITSEE, OF PHILADELPHIA, PENNSYLVANIA.

SECONDARY BATTERY.

SPECIFICATION forming part of Letters Patent No. 793,881, dated July 4, 1905.

Application filed March 17, 1893. Serial No. 466,533.

*To all whom it may concern:*

Be it known that I, ISIDOR KITSEE, a citizen of the United States, residing at Philadelphia, in the county of Philadelphia and State of Pennsylvania, have invented certain new and useful Improvements in Secondary Batteries, of which the following is a specification.

My invention relates to the positive-pole electrodes of secondary batteries.

In secondary cells the electrodes of which have metallic compounds as a vehicle for the electric energy the positive-pole electrode becomes active only after the material has undergone a higher oxidation. In cells where a compound of lead is used such compounds have to reach the highest oxidation before the cell is capable of storing the electric energy. In the act of charging the current tends to "inoculate," so to speak, the active oxygen in the pores of the highly-oxidized material. If such charging is continued after the limit of storing the energy is reached, the liberated gases attack the surface of the electrode to such an extent that the material disintegrates. The same result follows if the rate of the charging-current is greater than the capacity of the electrode to assimilate the liberated gas; but even if the charge rate is not abnormal and the charge only kept up till the saturation-point is reached the disintegration of the active material is only a question of time, for the simple reason that the active material having once attained its highest state of oxidation never returns to the state of low oxidation in its entirety, but only loses its surplus active oxygen. The next charging-current therefore meets material already in the highest state of oxidation, and the tendency of every new charge is to disintegrate more and more the already highly-oxidized active material. Careful experiments have established the fact that the rate of charge which an electrode can withstand without deterioration decreases with the number of charges and that the capacity for storing bears a certain relation to the over-oxidation of the active material.

The object of my invention is to restore to the active material of electrodes having already undergone charging and discharging processes the resisting and storing power—the "vitality," so to say—it originally possessed.

The active material on the positive or oxygen plate in a secondary cell of the lead type is through the action of the electric current converted into a peroxid, ($PbO_2$,) and slight traces of sulfate of lead remain partially as a binding material in the mass if either the charging-current is too high or of too long duration, or if the charging and discharging has taken place rather too often then the following state exists:

First. Whereas through the charging-current even an oxid of lead ($Pb_2O$) is converted into a peroxid the act of discharging does not reduce this high oxid entirely, but it only reduces the mass in a manner so that at the surface a compound of high oxid intermixed with low oxids and sulfates is formed, giving such a complex result when analyzed that the above quotation does not take in every phase of the resulting conversion. The sulfate is formed through the reduction of the peroxid to the proto state and then converting the protoxid into a sulfate salt. The farther toward the center, the less the reduction, and if the mass is of considerable thickness, it will be found that even after a discharge to 1.7 volts has taken place, the center still consists mostly of a peroxid with very slight traces of sulfate.

Second. If such a material is again subjected to the charging-current, and more specially if this charging-current is of a comparative high density, then three actions take place—(*a*) the formerly-reduced particles are again brought to the high oxidation, (*b*) the sulfate molecules are driven off from the surface, (*c*) the inner center is oxidized to an extent so as to drive out entirely all traces of sulfate and bring the mass to a state wherein the $PbO_2$ is converted, even if only momentarily, into a higher oxid. It has to be stated that this higher oxidation is only due to the overcharging of the active material and is very unstable; but it causes the material to become soft, losing its adherence and gradually going off into the liquid as a finely-divided powder. This state is dreaded by all manufacturers and users of secondary batteries, and yet it cannot be prevented, because, as said before, every new charging-current finds the active material in a higher state of oxidation and with less traces of sulfate, and therefore in a condition more liable to disintegration. To obviate this difficulty is the aim of my invention, and I obtain the result by the method described in this application, which method consists therein that the overoxidized material is brought in contact with the material capable of producing a chemical change in said overoxidized material in a manner so that part of the overoxidized particles are partially deoxidized and partially converted either into a sulfate or chlorid, as the case may be, and through this change the mass of active material is brought again to its former solidity and can again withstand the force of the charging-current without undue deterioration.

The underlying principle of my invention is the treatment of the electrode the active material of which has already undergone the oxidizing process through the action of the current with a material the affinity for oxygen of which is greater than the power said active material possesses for retaining its own state of high oxidation, or, in other words, I subject the high oxid of the electrode to a reducing process. The reduction can be accomplished through different agencies. A simple way of reducing the high oxid to a lower state is subjecting the electrode to the action of heat; but the difficulty arises that the active material being part of the whole electrode cannot be subjected to a temperature higher than the metallic conductor or non-metallic support can withstand. The process therefore is a very slow one; but where time is of no consideration the reducing process with the aid of dry heat can be done by suspending the electrode in a hermetically-sealed recess of one of the usual drying devices subjected to the action of heat. Great care should also be taken in raising the temperature, for the reason that, especially where the active material is of considerable thickness, spurting of the same follows if the deoxidation is too quick or too far advanced, and I found it necessary, first, to take during the reducing process frequent readings of an inserted thermometer; second, to interrupt the process at intervals and to renew the same only after exposing the electrode to a cooler temperature. In moist state and without the action of heat different chemical combinations can be used. Chlorid of sodium, for instance, applied to the electrode moist with the sulfuric acid, reduces the high oxid by forming with part of the chlorin contained in the sodium and chlorid of lead, the chlorid of sodium forming then a sulfate of soda. In other words, the chlorid of sodium (NaCl) dissolved in the electrolyte ($H_2SO_4$) plus water forms a sulfate of soda ($Na_2OSO_3$) plus water by taking part of the oxygen contained in the high oxid of lead and part of the sulfur contained in the electrolyte, and the so-reduced high oxid of lead combines with part of the chlorin released through the forming of said sulfate salt. The deoxidizing process can also be carried out through the agency of gases. If sulfurous gas is used, it is only necessary to inclose the electrode in a vessel and to introduce the gas into the vessel. The active material should be moist throughout. The highly-oxidized material will combine with the gas, forming a sulfate; but if the active material is of considerable thickness it is best to repeat the process, each time moistening the electrode with water or very diluted sulfuric acid, it being understood that the sulfurous gases will form in the presence of oxygen and moisture a sulfate. Great care should be exercised. The active material is apt to be raised to too high a temperature in the act of undergoing the chemical change, and if the gas is introduced in a concentrated state and the electrode allowed to become dry it happens that the raised temperature is sufficient to break up the whole electrode, to soften the support if such is of hard rubber, and even attack the metallic conductor; but I do not limit myself to the described chemicals, as many other compounds are capable through their great affinity for oxygen to withdraw one or more atoms of the gas from its combination with the material of the electrode.

To obviate misunderstandings, I remark right here that wherever I use in the application or claims the word "reducing" or "renovating" in connection with the active material of the electrode I understand under it the action through which the material loses a greater or lesser part of its oxygen, no matter if in consequence of it said material combines with another element or compound or not.

Having now described my invention, what I claim as new, and desire to secure by Letters Patent, is—

1. The method of restoring the usefulness of overcharged active material in secondary cells which consists in bringing said active material into contact with a solution adapted to in part reduce said active material to a lower oxid and in part change the same to a salt adapted to act as binder for the particles of said lower oxid.

2. The method of treating positive-pole electrodes for secondary cells which consists in bringing said electrodes in contact with a compound adapted to reduce part of the active material of said electrodes and to convert part of said active material into a salt adapted to serve as a binder for the oxid particles.

3. The method of renovating electrodes, having served as positive-pole electrodes in secondary batteries, which consists in bringing said electrodes in contact with a material capable of changing part of the high oxid of said electrodes into a low oxid and part of the oxid of said electrodes into a compound adapted to serve as binder for the deoxidized particles.

4. The method of reimparting to the active material of electrodes, having served as positive-pole electrodes in secondary cells, the solidity it originally possessed, which consists in subjecting said electrodes to the action of a material capable of reducing part of the highly-oxidized active material to a state of low oxidation, and capable of converting part of the oxidized material into a salt adapted to act as binder.

In testimony that I claim the foregoing as my invention I hereunto sign my name this 4th day of August, 1890.

ISIDOR KITSEE.

Witnesses:
   DAVID S. WILLIAMS,
   WALTER TAMARISS.